(12) United States Patent
Mead et al.

(10) Patent No.: US 6,493,706 B1
(45) Date of Patent: Dec. 10, 2002

(54) ARRANGEMENT FOR ENHANCING WEIGHTED ELEMENT SEARCHES IN DYNAMICALLY BALANCED TREES

(75) Inventors: Andrew Joseph Mead; Scott Allen Bales, both of Durham, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/427,033

(22) Filed: Oct. 26, 1999

(51) Int. Cl.[7] .............................................. G06F 17/30
(52) U.S. Cl. .......................... 707/3; 707/100; 707/101; 707/102; 707/5; 707/6
(58) Field of Search ................................. 707/2, 3, 100, 707/101, 102, 5, 6, 7; 345/854; 341/51; 708/203; 711/118, 143

(56) References Cited

U.S. PATENT DOCUMENTS

| | | | | |
|---|---|---|---|---|
| 5,263,160 A | * | 11/1993 | Porter et al. | 340/146.2 |
| 5,359,724 A | * | 10/1994 | Earle | 707/205 |
| 5,557,786 A | * | 9/1996 | Johnson, Jr. | 707/101 |
| 5,640,551 A | * | 6/1997 | Chu et al. | 375/240 |
| 5,765,165 A | * | 6/1998 | Harper | 707/100 |
| 5,950,198 A | * | 9/1999 | Falls et al. | 707/203 |
| 6,029,170 A | * | 2/2000 | Garger et al. | 707/1 |
| 6,032,207 A | * | 2/2000 | Wilson | 707/102 |
| 6,061,679 A | * | 5/2000 | Bournas et al. | 340/392 |
| 6,347,318 B1 | * | 2/2002 | Rokicki | 707/100 |

* cited by examiner

Primary Examiner—Jean M. Corrielus
(74) Attorney, Agent, or Firm—Leon R. Turkevich

(57) ABSTRACT

A processor-based system configured for searching in dynamically balanced trees is configured for linking the most often-searched elements of the tree to optimize search performance. Data elements include pointers for a tree-based index ordering and a doubly-linked list based index ordering. A background process links the most often-searched elements according to the linked list ordering and maintains the linked list ordering by first determining those elements having the highest importance values, defined as a number of times an element is successfully searched relative to aging or decay function. The linked list ordering is then arranged based on descending importance values. Each element also includes a go-to-tree flag, indicating to a search engine the point at which it is no longer beneficial to continue searching according to the doubly-linked list ordering. Hence, a search engine that begins searching the elements according to the doubly-linked list ordering will begin searching of the tree structure for the specified key entry in response to detecting an element having a go-to-tree flag set to true. Hence, the doubly-linked list may optimize search performance when the most often-searched elements may be deep within a tree, while insuring that unnecessary overhead is not introduced into the search routine.

30 Claims, 4 Drawing Sheets

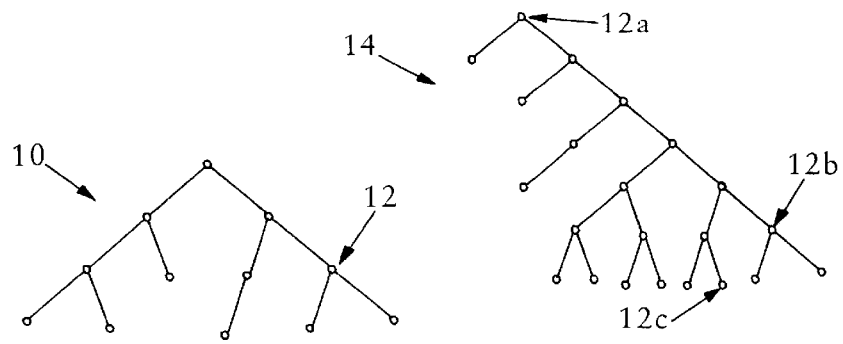
Fig. 1A
(Prior Art)
Fig. 1B
(Prior Art)
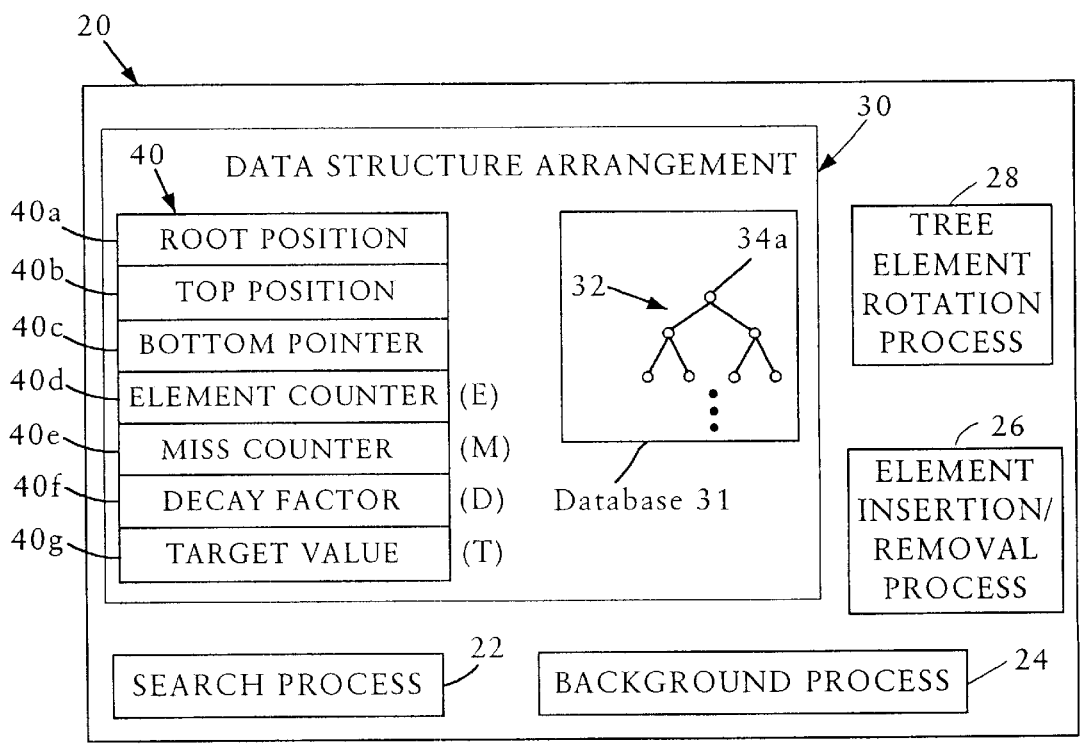
Fig. 2

ARRANGEMENT FOR ENHANCING WEIGHTED ELEMENT SEARCHES IN DYNAMICALLY BALANCED TREES

BACKGROUND OF THE INVENTION

1. Field of the Invention

The present invention relates to computer-implemented search techniques, more specifically to arrangements for improving search methodologies in dynamically balanced trees.

2. Description of the Related Art

Different computer-based search techniques have been developed in an effort to reduce the time necessary to search for data records within a computerized database. Examples of conventional search techniques include sequential searches of database records in an ordered table, or binary searches of database records based on a key entry that uniquely identifies a database record.

These different computer-based search techniques often use a prescribed index to search for a database record. For example, database records may be indexed according to a tree arrangement to quickly insert and locate data. One limitation of trees is that searching of the tree is optimized on the composition of the "key" used to identify tree elements. For example the actual data, or an abstraction or subset of the data is used to uniquely identify each element within the tree. Although trees can be built dynamically as a new data entry is added, a disadvantage of trees is that efficiency of a search operation (i.e., minimizing the average number of data records that need to be accessed during a search) is substantially degraded if the data is not evenly distributed within a tree. A reduced efficiency of a search operation can be critical to performance in time-sensitive applications, such as networked switching systems that need to access network address forwarding information in real time.

One aspect of even distribution of data involves whether the tree is balanced structurally. FIGS. 1A and 1B are diagrams illustrating a tree having a balanced structure and a tree having an unbalanced structure, respectively. The balanced tree 10, illustrated as a binary tree, has a group of elements 12 that are evenly distributed throughout the tree 10, enabling searches throughout the tree 10 to be performed efficiently relative to the total number of elements 12; in other words, a search through the tree 10 would require at most 4 accesses, based on the depth of the tree 10, where the number of accesses per searche equals log(n), n being equal to the number of elements 12. FIG. 1B is an example of a tree 14 having an unbalanced structure, resulting in possibly a substantial greater number of accesses per search throughout the tree 14. On average, a relatively larger number of access attempts per search are required to find any given element 12 in the unbalanced tree 14.

A possibly more important aspect of even distribution in a tree involves the distribution of data elements within the tree relative to the frequency in which the data elements are accessed. In particular, the use of trees for searching for a data element provides a reasonable level of efficiency when the data elements in the database have an equal probability of being accessed by a search process. Although this assumption may be true for randomly-distributed groups of data entries such as entries for telephone directories and the like, this assumption is not true for relatively ordered groups of data entries. Use of trees for searching of relatively ordered data entries, or data systems having only a very few heavily-accessed data elements, may cause the tree-type index to have a lumpy distribution.

For example, the problem of lumpy distribution is substantial in network switches and/or network routers that rely on computer addresses in directing traffic through a network. The problems associated with lumpy distribution may be especially acute if heavily trafficked network nodes, for example servers or gateways, are located deep within the tree 14 (e.g., elements 12b and 12c), whereas network nodes having little traffic are located at or near the root of the tree (e.g., element 12a).

Tree rotation techniques are known for reconfiguring the unbalanced tree 14 into a more balanced structure similar to the balanced tree 10 of FIG. 1A. Although such techniques can balance the structure of the tree, the rotation techniques cannot account for the relative amount of traffic for particular nodes of the tree. Thus, the rotation techniques will result in a structurally balanced tree that still contains a lumpy distribution of data elements; hence, search operation efficiency is still degraded due to the large number of searches needed to locate a heavily accessed element, for example a server or gateway, that is located deep within the tree. If a highly sought after element is positioned at the bottom of a balanced tree, resulting in a lumpy distribution, then the average number of searches will trend towards the depth of the tree, reducing the efficiency of the search operation during use of the balanced tree.

SUMMARY OF THE INVENTION

There is a need for reducing the adverse effects of trees having an lumpy distribution of elements when searching for a given key entry, without sacrificing a search operation for finding or verifying the existence of a key, without the necessity of constant maintenance of the tree.

There is also a need for an arrangement that enables the bypassing of a tree for identification of the most heavily accessed elements with the minimum number of search operations, regardless of the location of the most heavily accessed elements within the tree.

These and other needs are attained by the present invention, where additional pointers for each data element are generated that enable the data elements to be searched as a linked list in an order based on determined importance values of the elements within the tree. The searching of the data elements indexed according to a linked list, as opposed to the existing tree structure, enables the search engine of a computer-based system to identify heavily-trafficked elements of the tree with a minimal number of searches.

According to one aspect of the present invention, a method is provided in a computer system of searching for a specified key entry. The method includes determining an importance value for each element of a tree structure used for searching for the specified key entry. Each of the elements has a corresponding key entry, and the importance value indicates a first probability that the corresponding element includes the specified entry. The method also includes linking at least a first number of the elements according to an order based on the respective determined importance values, determining an estimated average number of accessed elements per search of at least one of the linked first elements and the tree structure, and searching selected linked first elements for the specified key entry, prior to searching the tree structure. The searching of the selected linked first elements of the tree structure is based on the respective importance values being greater than the estimated average number of accessed elements per search.

The linking of the first number of the elements according to an order based on the respective determined importance value enables a search engine to identify the most heavily-searched elements of the tree with a minimum number of searches, based on the determined importance values for each of the linked first elements. In addition, the determination of an estimated average number of accessed elements per search enables the linked first elements to identify a point at which a search process should discontinue searching through the linked first elements and begin searching of the tree structure for the specified key entry.

Hence, the searching for the most heavily-accessed elements can be optimized, without substantially increasing the number of accesses necessary per search for finding an element in the tree structure.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, where elements having the same reference numeral designations represent like elements and wherein:

FIGS. 1A and 1B are diagrams illustrating balanced and unbalanced trees, respectively.

FIG. 2 is a block diagram illustrating a processor-based system for searching for a specified key entry according to an embodiment of the present invention.

BEST MODE FOR CARRYING OUT THE INVENTION

Figure 3A:
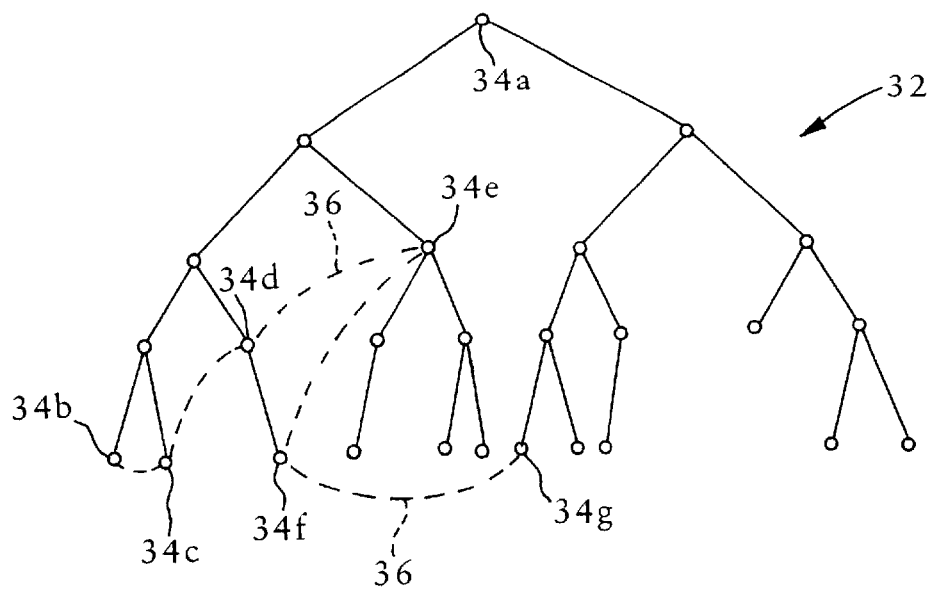
FIGS. 3A and 3B illustrate in further detail the indexing of the data elements of FIG. 2 and the data element structure having tree pointers and linked list pointers according to an embodiment of the present invention.

FIG. 2 is a block diagram illustrating a processor-based system for searching for a specified key entry according to an embodiment of the present invention. The processor-based system 20 includes a search process 22, a background process 24, an element insertion and removal process 26, and a tree element rotation process 28. Each of the processes 22, 24, 26 and 28 may be implemented as executable code stored on a tangible medium, for example a randomly accessible computer memory, disk type memories, digital tapes, and the like, and which is executable by a microprocessor or other CPU within the processor-based system 20. Execution of the instructions stored in the tangible medium by the microprocessor causes certain operations and functions to be performed, described below.

As described in detail below, the processor-based system 20 is configured for generating and storing a data structure arrangement 30. The data structure arrangement 30 is typically stored in a random access memory internal to the processor-based system 20. The data structure arrangement 30 includes a database 31 that stores a plurality of data elements 34. As described below, the data elements 34 include different pointers that enable the group of data elements to be viewed (i.e., searched) either as a tree or a linked list. For illustration sake, the data elements 34 are illustrated as indexed as a tree structure 32, where one data element 34a serves as a root node for the tree structure.

FIG. 3A is a diagram illustrating in detail the data elements 34 indexed according to the tree structure 32, and according to a doubly linked list sequence 36. In particular, a selected group of the data elements 34 are indexed according to the doubly linked list sequence 36, enabling a search engine 22 to quickly identify heavily-trafficked elements within the tree structure 32. For example, the doubly linked list sequence 36 is formed by the sequential indexing of data elements 34b, 34c, 34d, 34e, 34f, and 34g, described below.

The data structure arrangement 30 of FIG. 2 also includes a group of global data elements 40 that are used by the background process 24 for generation and maintenance of the doubly linked list sequence 36. The global elements 40 include a root pointer 40a for pointing to the root element 34a of the tree 32, a top pointer 40b for pointing to the top element 34b (i.e., the first element) of the doubly-linked list sequence 36, and a bottom pointer 40c for pointing to the bottom element (e.g., 34g) of the doubly-linked list 36. Note that the doubly-linked list 36 of FIG. 3A is illustrated as having only six data elements 34, although the doubly-linked list 36 would index all the data elements 36 of the tree 32.

The global elements also include an element counter 40d configured for counting the number (E) of elements 34 in the database 31, logically connected into both the tree structure 32 and the doubly-linked list 36. The global elements also include a miss counter 40e configured for counting a number of misses (M) from searches of data elements 36 (e.g., using the doubly-linked list 36 and/or the tree structure 32) while searching for a specified key entry. For example, if the search process 22 searches through the doubly-linked list 36 and the tree structure 32 for a specified key entry corresponding to a MAC address and the specified entry is not present in the tree structure 32, the miss counter 40e is incremented. The global elements 40 also include a decay factor element 40f configured for storing a decay factor (D) that is used for decay or aging functions in determining the relative importance of the elements in the doubly-linked list 36. The global elements 40 also include a target value element 40g configured for storing an estimated average number of accessed elements per search, of either the linked list 36 or the tree structure 32, as a target value (T). As described below with respect to FIG. 3B, each of the elements 34 includes a go-to-tree flag that is selectively set based on comparison between the number of matches between the corresponding element relative to a prior number of searches, and the estimated average number (T) of accessed elements per search.

Figure 3B:
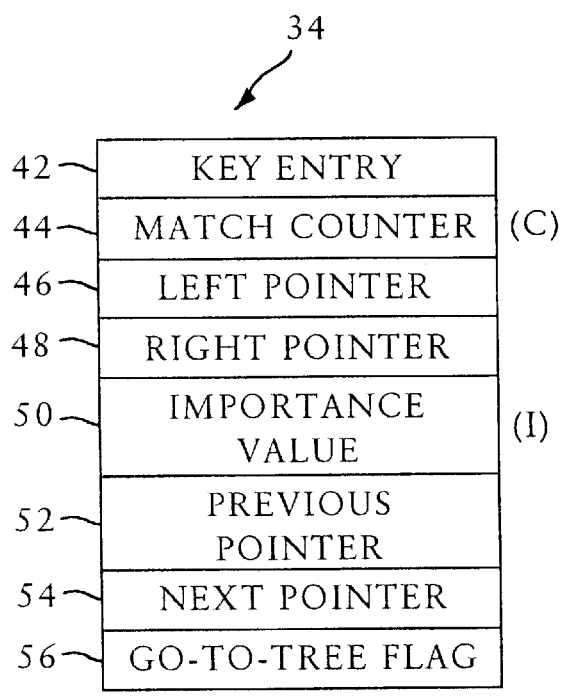

FIG. 3B is a diagram illustrating the structure of each data element 34. As described above, each data element 34 may be indexed as a tree structure 32 and/or a doubly-linked list 36. As shown in FIG. 3B, each data element 34 includes a key entry 42, and a match counter 44 configured for identifying a number of matches (C) between the corresponding element and key entry searches over a prescribed interval. The element 34 also includes a left pointer 46 and a right pointer 48 as tree pointers for establishing a connection to at least one other element of the tree structure 32. If the element 34 is at a bottom of the tree 32, then the pointer values for the left pointer 46 and the right pointer 48 will have stored null values.

The data element 34 also includes data entries for indexing of the data element according to the doubly-linked list 36. Specifically, the data element 34 also includes an importance value (I) 50 that indicates a probability that the corresponding key entry 42 matches a specified key entry used by the search process 22 during searching throughout the doubly-linked list 36 or the tree structure 32. The data element 34 also includes a previous pointer 52 and a next pointer 54 for identifying the previous and next elements within the doubly-linked list 36, respectively. Hence, the pointers 52 and 54 enable the element 34 to maintain its proper ordering within the doubly-linked list 36, described below. Each element 34 also includes a go-to-tree flag 56, described below, that specifies a point in the linked list 36 at which the search process 22 should stop searching the doubly-linked list 36 and switch to searching using the balanced tree 32.

The data elements 34 are linked to form the doubly-linked list 36 by the background process 24 of FIG. 2, to optimize searching for the most important (i.e., most often searched) elements of the tree structure 32. As described below, the background process 24 periodically traverses the tree structure 32 to identify those elements 34 having the highest match counter values (C) over a prescribed interval. The match count values (C) are correlated to the decay factor (D) to generate an importance value (I) that identify the probability that the corresponding element 34 includes a corresponding key entry 42 that satisfies the specified key entry as a search criterion. The background process then orders the data elements 34 within the doubly-linked list 36 by descending importance values. The importance value (I) thus serves to identify the "lumpiness" of the corresponding data element 34, enabling the data elements 34 to be ordered in a sequence optimized for the lumpiness. Hence, the background process 24 serves as a means for ordering the data elements 34 according to a linked list ordering.

Once the background process 24 generates the linked list 36 with the elements 34 having an order based on descending importance values, the background process selectively sets the go-to-tree flag (F) 56 based on a determination of whether it is more beneficial to continue searching in the doubly-linked list 36, as opposed to switch to using the balanced tree pointers and search methods to continue searching for the specified key entry.

The selective setting of the go-to-tree flag (F) is based on the performance of the tree 32, namely whether a heavily-accessed data element (e.g., 34b) is deep within the tree 32, and/or whether a rarely-accessed data element is near the root node 34a the tree. As described above, a perfectly-balanced binary tree (i.e., all the elements within the tree have a random distribution that provides a uniform frequency of accesses) requires a maximum number of searches equal to $log_2(n)$, where n is the number of elements in the tree 32. For example consider a perfectly balanced tree having a depth of 10 rows, resulting in $2^{10}$ possible elements in a bottom row and a total of 2,047 elements within the tree. A perfectly balanced tree would require no more than 10 searches; however since the number of nodes at one level of a perfectly balanced tree is twice the number of nodes at the previous level, then the average number of accesses per search would actually be much closer to 9 accesses. Hence, it is unlikely that any particular heavily-accessed node will be near the top of the tree structure.

In order to balance the effectiveness of searching through the linked list 36 for the most important elements versus avoiding the addition of extra unnecessary search operations in addition to the required searches throughout the tree structure 32, the target value (T) in element 40g is determined as a "break even point" for determining at what point a doubly-linked list 36 is no longer beneficial for the search process 22 to continue searching in the doubly-linked list 36. As described below, if the search process 22, upon traversing the doubly-linked list 36, detects an element 34 having a go-to-tree flag set to true (F=1), the search process 22 discontinues searching in the doubly-linked list 36 and begins searching the tree 32, beginning with the root element 34a.

Figure 4:
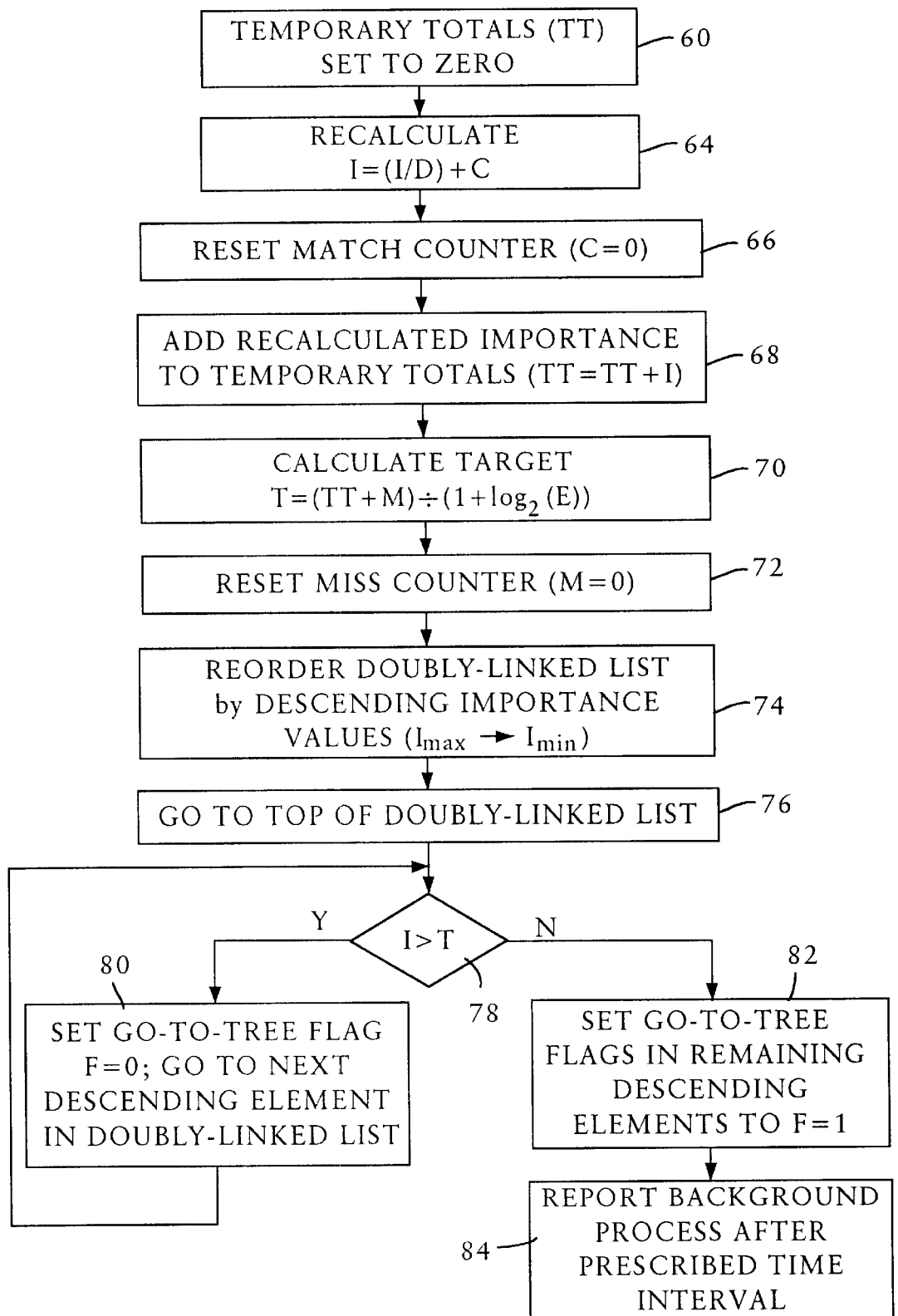
FIG. 4 summarizes the background process of FIG. 2 for generating the pointers for the doubly linked list according to an embodiment of the present invention.

FIGS. 4A and 4B are diagrams summarizing the method by the background process 24 for linking the data elements 34 into the doubly-linked list 36 according to an embodiment of the present invention. The background process 24 is executed by the processor based system 20 at prescribed intervals, for example at prescribed time intervals such as once a second, once a minute, and the like, depending on the considerations between having an accurate doubly-linked list versus the processing requirements of the system. The method begins in step 60, where a temporary totals value (TT) is set to zero. The background process 24 then begins traversing each element 34 of the tree 32 to determine a corresponding importance value (I). Specifically, the background process 24 divides the existing corresponding importance value (I) by the decay factor (D), and adds the match counter value (C) for the corresponding element 34 to obtain the recalculated importance value (I=I/D+C) for the corresponding element 34 in step 64. Note the decay factor must be greater than one. The background process 24 then resets the corresponding match counter value to zero (C=0) in step 66, and adds the recalculated importance value to the temporary total value (TT=TT+I) in step 68. The background process then continues the recalculation of the importance values for each of the elements 34 of the tree structure 32, and adds the recalculated importance values to the temporary total value (TT).

Referring to FIG. 4B, after determining the recalculated importance values for all the elements 34 of the tree structure 32, and summing up the importance values as the temporary totals value (TT), the background process 24 calculates the target value (T) as the estimated average number of accessed elements per search in step 70. Specifically, the target value (T) is calculated based on the probability ($P_x$) that the search process 22 will find the element in the linked list, relative to the level (L) at which the identified elements resides within the list, plus the probability that the element is not within the linked list ($1-P_x$), multiplied by the possibility of searching both within the linked list and the tree structure. Since the average number of searches in a balanced tree can be expressed as $log_2$ (E), the "break even point" can be expressed as:

$$log_2(E) > P_x L + (1-P_x)(L+log_2(E)),$$

and can be easily approximated by:

$$P_x > L/(log_2 E).$$

Hence if the probability ($P_x$) is greater than $L/(log_2 E)$, for a given data element, then it is advantageous to continue searching using the linked list approach instead of the tree structure. This expression can be reasonably approximated in step 70 by calculating the target value (T) as equal to the sum of the temporary totals of the importance values, plus the number of misses (M), divided by $1+log_2(E)$.

After determining the target value, the background process 24 resets the miss counter in element 40e to zero in step 72.

The background process 24 then begins a second pass by reordering the doubly-linked list by descending importance values in steps 74. Specifically, pointers 52 and 54 in each data element 34 specify the previous and subsequent data element in the linked list 36, respectively; hence, the background process 24 adjusts the pointers 52 and 54 as necessary to change the specified order of the linked list. The background process 24 then returns to the top of the doubly-linked list in step 76, and selectively sets the go-to-tree flag in each of the elements 34 of the doubly-linked list 36 based on the corresponding importance value (I) being greater than the estimated average number (T) of accessed elements per search. Specifically, the background process checks in step 78 whether the corresponding importance value (I) is greater than the target value (T). If the importance value is greater than the target value, the background process 24 sets the go-to-tree flag to zero (F=0) in the corresponding element 34, and goes to the next descending element 34 in the doubly-linked list 36. However, if the background process 24 detects that the importance value (I) for the corresponding element 34 is less than or equal to the target value (T), indicating that it is no longer beneficial to continue searching in the doubly-linked list 36, the background process 24 sets the go-to-tree flags in the remaining descending elements 34 to (F=1) in step 82. The background process may then be repeated at prescribed time intervals in step 84.

Although the ordering of the doubly-linked list 36 and the setting of the go-to-tree flags 56 are shown as distinct steps for ease of understanding, the setting of the go-to-tree flag 56 can be set concurrently with setting the pointers 52 and 54 in the corresponding data element 34 during ordering of the doubly-linked list 36.

Figure 5:
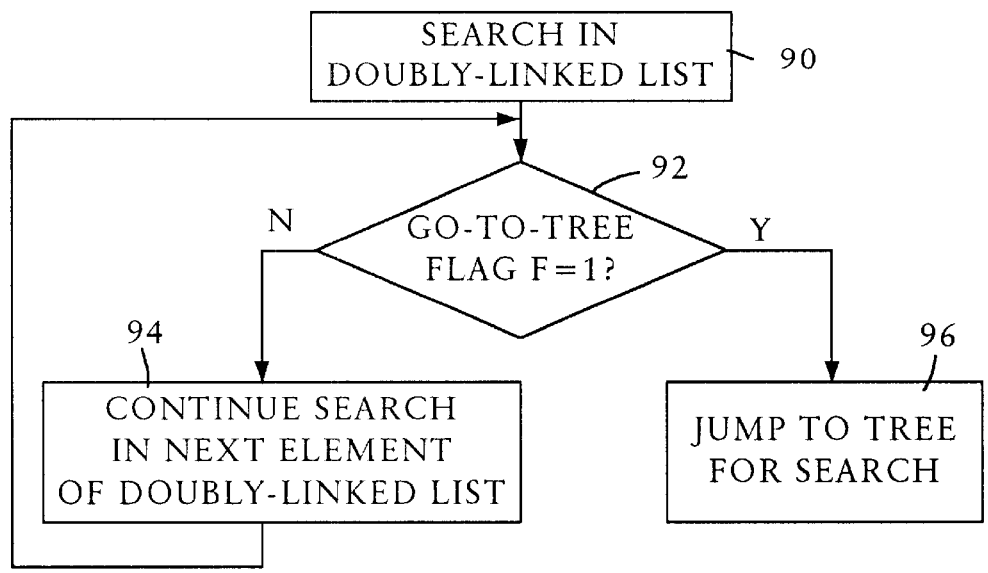
FIG. 5 is a flow diagram illustrating the search process of FIG. 2.

Once the data elements 34 have been linked to form the doubly-linked list 36 in order of descending importance values, and once the go-to-tree flags 56 have been appropriately set, the search process 22 may use the doubly-linked list 36 for searching for specified key elements. For example, FIG. 5 is a flow diagram illustrating the method used by the search process 22 for searching for a specified key entry. The search process 22 begins searching for the specified key entry using the doubly linked list 36 in step 90. Since the top of the doubly-linked list 36 (e.g., element 34b) has the key entry 42 that corresponds to the highest searched element, there tends to be a higher probability that the search process 22 will find the element corresponding to the specified key entry within the first few elements using the doubly-linked list as an index for the search. As described previously, this bypass of the tree structure 32 as an index can provide substantial savings if the distribution of elements within the tree structure 32 locates heavily-accessed elements (e.g., 34b) near the bottom of the tree.

If the search process 22 determines in step 92 that the go-to-tree flag indicator is set to one as it traverses the doubly-linked list 36, the search process 22 begins searching of the tree structure 32 for the specified key entry in step 96. Alternatively, if the corresponding element in the doubly-linked list 36 does not have to go-to-tree flag set to 1, the search process 22 continues searching in the next element of the doubly-linked list in step 94. Hence, searching for a specified key entry can be dramatically improved where the tree structure 32 has a relatively large number of elements and the tree structure is substantially unbalanced. For example, FIG. 3A illustrates that a search process 22 would locate data element 34c within two search operations using the doubly linked list 36, and five search operations using the tree structure 32; hence, the go-to-tree flag 56 for element 34c would be set to 0. Searching for the data element 34d, however, would require three search operations using the doubly-linked list 36 and four search operations using the tree structure 32; moreover, searching for the data element 34e would require more search operations if the doubly-linked list 36 was used. Hence, the go-to-tree flag 56 for data element 34c would probably be set to 1.

Figure 6A:
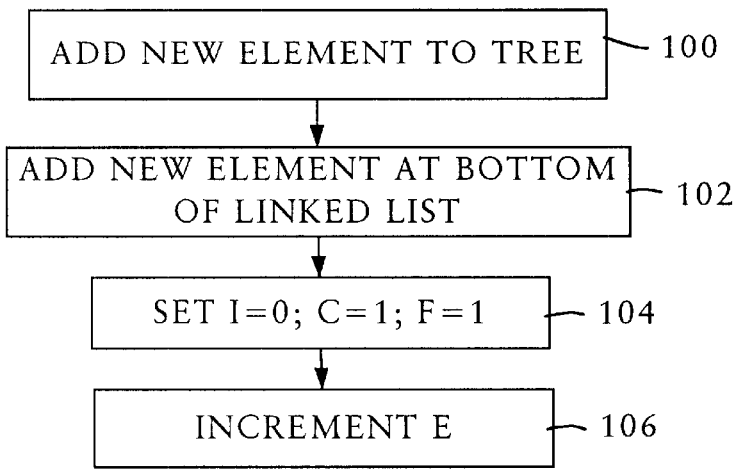
FIGS. 6A and 6B are diagrams illustrating a tree element insertion and removal process of FIG. 2, respectively.
Figure 6B:
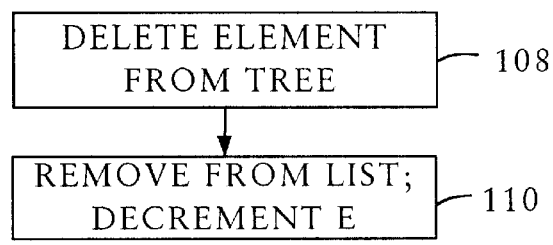

FIGS. 6A and 6B illustrate methods used by the element insertion/removal process 26 to add or delete elements from the tree. As a new element is added to the tree 32 by the element insertion process 26 in step 100, the insertion process 26 also adds the new element at the bottom of the linked list in step 102 by setting the next pointer 54 of the previous last element to point to the new last element. The element insertion process then sets the importance value for the new element to zero, the match counter value to 1, and the go-to-tree flag to 1 in step 104, and increments the element counter 40d in step 106.

If an element 34 is to be deleted from the tree structure 32, the removal process 26 deletes the element 34 from the tree in step 108 by resetting the pointers 46 and 48 for the upper element; the removal process 26 removes the element from the linked list in step 110 by resetting the previous and next pointers 52 and 54 accordingly, and decrements the element counter 40d.

According to the disclosed embodiment, search techniques in a processor-based system may be dramatically improved without the necessity of performing tree rotation for an existing tree structure where heavily-accessed data elements are in the middle or bottom of a tree. Rather, the data elements may be linked to enable searching using a doubly-linked list to optimize search performance for heavily-accessed data elements.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a computer system of searching for a specified key entry, the method comprising:

determining an importance value for each element of a tree structure used for searching for the specified key entry, each said element having a corresponding key entry, the importance value indicating a first probability that the corresponding element includes the specified key entry;

linking at least a first number of the elements according to an order based on the respective determined importance values;

determining an estimated average number of accessed elements per search of at least one of the linked first elements and the tree structure; and searching selected ones of the linked first elements for the specified key entry, prior to searching the tree structure, based on the respective importance values being greater than the estimated average number of accessed elements.

2. The method of claim 1, wherein the step of determining an importance value for each of the elements includes:

determining for said each element a match count value indicating a number of matches for said each element relative to key entry searches over a prescribed interval; and calculating the importance value based on the corresponding match count value.

3. The method of claim 2, wherein the calculating step includes dividing a previously-stored value of the importance value for the corresponding element by a prescribed decay factor, and adding the match count value to obtain the corresponding importance value.

4. The method of claim 3, wherein the step of determining an importance value for each of the elements further includes resetting the match count value to zero after obtaining the corresponding importance value.

5. The method of claim 2, wherein the prescribed interval corresponds to a prescribed time interval.

6. The method of claim 2, wherein the step of determining an estimated average number of accessed elements includes:
   determining a first total number as a sum of the importance values of the elements of the tree structure;
   determining a second total number of misses for the key entry searches relative to the elements of the tree structure over the prescribed interval; and
   calculating the estimated average number of accessed elements based on the first total number, the second total number, and a number of the elements of the tree structure.

7. The method of claim 6, wherein the step of calculating the estimated average number of accessed elements includes:
   determining a sum of the first total number and the second total number; and
   dividing the sum of the first total number and the second total number by a number based on a logarithmic value of the number of the elements of the tree structure.

8. The method of claim 1, wherein the linking step includes selectively setting a go-to-tree flag in each of the linked first elements to zero based on the corresponding importance value being greater than the estimated average number of accessed elements, the go-to-tree flag indicating one of continued searching through the linked first elements and initiating a search of the tree structure for the specified key entry.

9. The method of claim 1, further comprising repeating a background process in the computer system at prescribed intervals, the background process including:
   recalculating the importance value for said each element of the tree structure; and
   selectively reordering the linked first elements based on the recalculated importance values.

10. The method of claim 9, wherein the step of repeating the background process further includes:
    recalculating the estimated average number of accessed attempts per search of at least one of the linked first elements and the tree structure on the recalculated importance values and a determined number of misses of key entry searches relative to the elements of the tree structure at least over a preceding prescribed interval;
    selectively setting go-to-tree flags in each of the elements of the reordered linked first elements based on the respective importance values being less than or equal to the recalculated estimated average number of accessed attempts, each go-to-tree flag indicating one of continued searching in the linked first elements and starting searching of the tree structure for the specified key entry.

11. The method of claim 1, further comprising:
    adding a new element to the tree structure;
    adding the new element to a bottom end of the linked first elements with a minimum determined importance value; and
    recalculating the estimated average number of accessed elements based on the added element.

12. The method of claim 1, further comprising:
    deleting one of the elements from the tree structure and the linked first elements; and
    recalculating the estimated average number of accessed elements based on the one element.

13. A processor-based system for searching for a specified key entry, the system comprising:
    a memory system for storing a plurality of data elements, each data element configured for storing:
    (1) a key,
    (2) first and second pointers configured for locating left and right ones of the other data elements according to a tree index configuration,
    (3) a third pointer configured for locating a subsequent one of the other data elements according to a linked list index configuration,
    (4) an importance value indicating a first probability that the corresponding key entry matches the specified key entry, and
    (5) a go-to-tree flag indicating whether searching should continue according to the linked list index configuration or initiate according to the tree index configuration;
    a target value element configured for storing an estimated average number of accessed elements per search of the data elements;
    an index generation process, executable by the processor, for setting the first, second and third pointers and the importance value in each of the data elements for selective searching of the data elements according to at least one of the tree index configuration and the linked list index configuration, the index generation process ordering the data elements into the linked list index configuration based on the respective importance values and selectively setting each go-to-tree flag based on a comparison between the corresponding importance value and the estimated average number of accessed elements per search; and
    a search process, executable by the processor, for searching for the specified key entry according to the linked list index configuration, the search process halting searching according to the linked list index configuration and beginning searching according to the tree index configuration in response to detecting one of the go-to-tree flags.

14. The system of claim 13, wherein the index generation process includes a periodic background process, executable by the processor, configured for periodically recalculating the importance value for each data element and selectively reordering the data elements in the linked list index configuration based on the recalculated importance values.

15. The system of claim 14, wherein the periodic background process further recalculates the estimated average number of accessed attempts per search based on the recalculated importance values, the determined number of misses for key entry searches relative to the data elements over a preceding prescribed interval, and the counted number of data elements.

16. The system of claim 14, further comprising an element insertion/removal process, executable by the processor, for selectively resetting the first, second, and third pointers of a selected group of the data elements for inserting a new element to the tree index configuration and the linked list index configuration, and selectively deleting one of the elements for each of the tree index configuration and the linked list index configuration.

17. A computer readable medium having stored thereon sequences of instructions for searching for a specified key entry, the sequences of instructions including instructions for performing the steps of:

determining an importance value for each element of a tree structure used for searching for the specified key entry, each said element having a corresponding key entry, the importance value indicating a first probability that the corresponding element includes the specified key entry;

linking at least a first number of the elements according to an order based on the respective determined importance values;

determining an estimated average number of accessed elements per search of at least one of the linked first elements and the tree structure; and searching selected ones of the linked first elements for the specified key entry, prior to searching the tree structure, based on the respective importance values being greater than the estimated average number of accessed elements.

18. The medium of claim 17, wherein the step of determining an importance value for each of the elements includes:

determining for said each element a match count value indicating a number of matches for said each element relative to key entry searches over a prescribed interval; and calculating the importance value based on the corresponding match count value.

19. The medium of claim 18, wherein the calculating step includes:

dividing a previously-stored value of the importance value for the corresponding element by a prescribed decay factor, adding the match count value to obtain the corresponding importance value.

20. The medium of claim 19, wherein the step of determining an importance value for each of the elements further includes resetting the match count value to zero after obtaining the corresponding importance value.

21. The medium of claim 18, wherein the prescribed interval corresponds to a prescribed time interval.

22. The medium of claim 18, wherein the step of determining an estimated average number of accessed elements includes:

determining a first total number as a sum of the importance values of the elements of the tree structure;

determining a second total number of misses for the key entry searches relative to the elements of the tree structure over the prescribed interval; and calculating the estimated average number of accessed elements based on the first total number, the second total number, and a number of the elements of the tree structure.

23. The medium of claim 22, wherein the step of calculating the estimated average number of accessed elements includes:

determining a sum of the first total number and the second total number; and dividing the sum of the first total number and the second total number by a number based on a logarithmic value of the number of the elements of the tree structure.

24. The medium of claim 17, wherein the linking step includes selectively setting a go-to-tree flag in each of the linked first elements in the linked list to zero based on the corresponding importance value being greater than the estimated average number of accessed elements, the go-to-tree flag indicating one of continued searching through the linked first elements and initiating a search of the tree structure for the specified key entry.

25. The medium of claim 17, further comprising instructions for performing the step of repeating a background process in the computer system at prescribed intervals, the background process including:

recalculating the importance value for said each element of the tree structure; and selectively reordering the linked first elements based on the recalculated importance values.

26. The medium of claim 25, wherein the step of repeating the background process further includes:

recalculating the estimated average number of accessed attempts between the linked first elements and the tree structure based on the recalculated importance values and a determined number of misses of key entry searches relative to the elements of the tree structure at least over a preceding prescribed interval;

selectively setting go-to-tree flags in each of the elements of the reordered linked first elements based on the respective importance values being less than or equal to the recalculated estimated average number of accessed attempts, each go-to-tree flag indicating one of continued searching in the linked first elements and starting searching of the tree structure for searching for the specified key entry.

27. The medium of claim 17, further comprising instructions for performing the steps of:

adding a new element to the tree structure;

adding the new element to a bottom end of the linked first elements with a minimum determined importance value; and recalculating the estimated average number of accessed elements based on the added element.

28. The medium of claim 17, further comprising instructions for performing the steps of:

deleting one of the elements from the tree structure and the linked first elements; and recalculating the estimated average number of accessed elements based on the one element.

29. A processor-based system for searching for a specified key entry, the system comprising:

a memory system configured for storing a plurality of data elements having respective key entries;

means for ordering the data elements according to a tree ordering and a linked list ordering, said means for ordering the data elements determining importance values for each of the data elements and ordering the data elements within the linked list ordering based on the respective determined importance values, the importance value indicating a first probability that the corresponding element includes the specified key entry; and a search process configured for searching for the specified key entry from among a selected group of the data elements according to the linked list ordering prior to searching for the specified key entry according to the tree ordering.

30. The system of claim 29, wherein the means for ordering includes means for determining an estimated average number of accessed elements per search, the means for ordering selectively setting a flag in at least of the elements based on the corresponding importance value being less than or equal estimated number of accessed elements per search, the search process initiating searching according to the tree ordering in response to detection of the flag in said at least one element.

* * * * *